June 9, 1953

F. A. KROHM 2,641,007

SWIVEL CONNECTION BETWEEN WINDSHIELD
WIPER BLADE UNIT AND ARM
Filed April 5, 1946

INVENTOR.
FRED A. KROHM
BY
Charles S. Penfold
ATTORNEY

Patented June 9, 1953

2,641,007

UNITED STATES PATENT OFFICE 2,641,007

SWIVEL CONNECTION BETWEEN WINDSHIELD WIPER BLADE UNIT AND ARM

Fred A. Krohm, Gary, Ind., assignor to Productive Inventions, Inc., a corporation of Indiana Application April 5, 1946, Serial No. 659,728

8 Claims. (Cl. 15—255)

This invention relates to windshield cleaning apparatus and more particularly is directed to means for connecting the wiper blade unit to the operating or driving arm.

In the majority of automotive vehicles now being manufactured, the point of connection between the drive shaft and the inner extremity of the operating arm supporting the wiper blade unit is generally disposed at some desirable distance in advance of the surface to be cleaned, and the connection means between the outer extremity of the arm and the unit is preferably such that the wiper may be pivoted or swung out of alignment with respect to the arm so that the wiper will clean the largest area possible and return to rest in a position substantially parallel to a side of the windshield frame; for example, the lower side when the shaft projects forwardly through the cowl of the vehicle body.

It is a known fact that when the wiper blade unit is in alignment with the wiper arm that the unit will wipe and clean the surface to be cleaned as intended because the plane formed by the wiper unit is positioned substantially at right angles to the windshield, thereby permitting the unit to properly tilt or pivot the same extent or amount in each direction as the unit is oscillated or moved back and forth across the windshield. It has been discovered, however, that when the blade unit is swung out of alignment or to a position transverse with respect to the longitudinal axis of the wiper arm in the manner referred to above, the plane of the unit, including the means for establishing the connection between the arm and unit, will be caused to assume a position other than a right angle, and as a consequence the unit will not properly clean the windshield because the unit will tilt to a greater extent in one direction than in another when the same is moved back and forth across the windshield.

Accordingly, the primary object of the present invention is to provide means for establishing an improved pivotal or swivel connection between the arm and the wiper unit whereby the correct plane or position of the unit with respect to the plane or surface to be cleaned may be predetermined to obtain the wiping action desired. The improved means, in effect, is constructed and arranged to compensate for the various angular positions of the parts above referred to.

The invention is particularly well adapted for use in cleaning not only substantially planar surfaces but windshields having curved or undulated surfaces where the angles above referred to may be quite critical.

Another object of the invention is to provide connection means of such a character that the wiper unit may be automatically held to any position to which it may be adjusted.

An additional object of the invention is to provide an arrangement in which no additional or separate parts are required to obtain performance of the invention.

A further object of the invention is to provide connection means which may be easily and quickly assembled on a production basis and when assembled, is well stabilized to withstand considerable shock and vibration.

Other objects and advantages of the invention will be apparent after considering the description hereinafter set forth in conjunction with the drawing annexed hereto.

Figure 7:
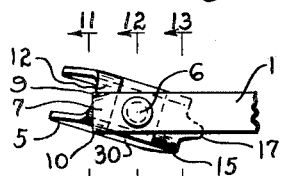
Figure 7 is a plan view similar to Figure 5, the shroud being removed.
Figure 8:
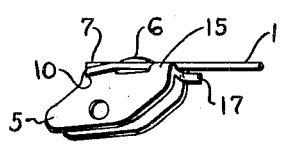
Figure 8 is a side view of the assembly depicted in Figure 7.
Figure 11:
Figure 12:
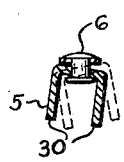
Figure 13:
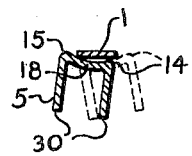
Figure 14:
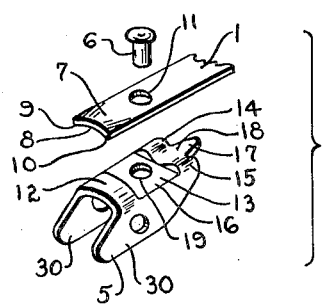

Figures 11, 12 and 13 are sectional views taken substantially on lines 11—11, 12—12 and 13—13 of Figure 7, respectively, illustrating the relation of certain parts at different points or locations; and Figure 14 is an exploded view of the end extremity of the wiper arm and certain other parts associated therewith.

Figure 1:
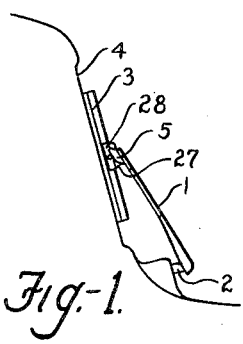
Figures 1 and 2 illustrate side and front views of a windshield wiper arm and associated wiper unit mounted with respect to a windshield for indicating the purpose of the invention.

In order to obtain a better understanding and the underlying reason or purpose of the invention, reference will first be made to Figures 1 through 3 of the drawing, wherein numeral 1 represents a wiper arm, member or bar supported on a shaft 2 for driving a blade unit 3 carried by the arm back and forth across the surface of an inclined pane 4 forming a part of the windshield. In the installation illustrated the shaft projects outwardly through the cowl of the vehicle adjacent the lower inner corner of the pane 4, and the point of connection between the arm and shaft is located some distance in advance of the windshield, thereby causing the arm to assume quite an angle with respect to the plane of the windshield. In such installations, as stated in the forepart of this specification, provision is made whereby the blade unit may be pivoted or swung out of alignment with the arm as shown by the full lines in Figure 2 so that the unit will wipe or clean the largest area of the glass possible and return to rest in a position substantially parallel to the lower side of the windshield frame as indicated by the dotted lines. Heretofore, such installations have not proven altogether too satisfactory for the reason that the wiper blade unit and means for connecting the same to the arm are forced to assume an angular position with respect to the plane of the windshield as depicted in Figure 3, and as a consequence the wiper unit will not vacillate or tilt the same extent during its travel in each direction, thereby preventing the wiping edges of the wiping element to properly contact and clean the glass. In fact, the inclination in certain installations may be so pronounced that the wiper unit is prevented from tilting either to one or the other side of the mid-point of its intended and normal arc of movement. This is particularly true when the wiper unit is swung to a considerable angle out of alignment with the arm. The present invention has been developed to offset the disadvantageous condition referred to so that the wiper unit will function or operate as illustrated in Figure 4.

Various means may be employed to practice the invention but the preferred mode is to provide the outer extremity of the wiper arm with a channel member 5 which constitutes a part of connection means for attaching the wiper unit to the arm, and to provide a channel and arm with cooperating means whereby the channel may be tilted with respect to the arm when it is rotated about the pivot rivet 6 securing the channel to the arm, thereby to compensate for any irregularity as evidenced in Figure 3, resulting from disalignment of the wiper unit with respect to the arm as described.

The cooperating means of the wiper arm comprises a portion 7 adjacent its outer extremity generally arcuate or curved in cross section to form a dished seat 8 and a pair of correspondingly spaced abutments 9 and 10, the latter preferably being disposed adjacent the longitudinal marginal edges of the wiper arm. The arm may be constructed as desired but is preferably made from a substantially flat strip of flexible material generally rectangular in cross section to obtain stability. The arm is provided with a hole 11.

The cooperating means on the channel member 5 includes a cam portion 12 generally arcuate or curved in cross section provided adjacent the outer extremity of the base portion 13 of the channel and a pair of spaced apart bosses, abutments or projections 14 and 15 adjacent the inner extremity of the base portion. The base portion 13 of the channel intermediate the cam portion 12 and the bosses 14 and 15 is preferably made substantially flat or planar in character as indicated at 16, and the portion 12 which substantially corresponds to the curvature of the portion 7 of the arm and the bosses are preferably raised or extend a desirable distance above the plane of the planar portion 16 to provide a clearance space between the latter portion and the overlying portion of the arm. The inner extremity of the base portion 13 is preferably provided with a rearwardly extending integral finger 17. The material of the base between the bosses is preferably formed to provide a concave or indented seat 18. The base portion is provided with a hole 19 corresponding to the hole 11 in the arm and the pivot rivet 6 extends through the holes and secures the channel member to the arm by upsetting the inner end of the rivet as clearly illustrated. The connection between the channel member and the arm is preferably such that the parts are held together in a manner whereby the channel member and associated wiper unit may be manually pivoted or rotated with respect to the arm to the position desired and be automatically held in such position. The clearance space between the channel and the arm contributes to an arrangement whereby the material adjacent the hole 11 in the arm may be drawn toward the underlying portion of the channel member to place the material under stress or tension by upsetting the rivet to the extent desired. This arrangement provides a simple, yet efficient and durable connection.

In view of the foregoing description, it should be manifest that when the channel member 5 and associated wiper unit 3 are in general alignment with the arm that the cam portion 12 of the channel will register with the seat 8 of the arm, and that the bosses 14 and 15 will engage the under surface of the arm at either side of its longitudinal axis to provide a well-balanced assembly suitable for installation where it is not essential that the wiper unit be positioned at an angle with reference to such axis.

Figure 2:
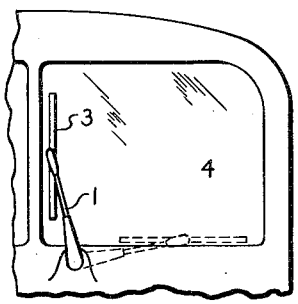
Figures 3, 4:
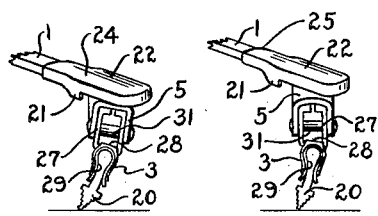
Figure 3 is a view showing the result or effects of the connection established between an arm and wiper unit prior to the application of the invention.
Figure 4 is a view similar to Figure 3 depicting the application and advantages of the invention.

In those installations which require that the wiper unit be angled as exemplified in Figure 2 of the drawing, the transition may be effected by merely pivoting or turning the channel and associated wiper unit to the desired position in which position it will automatically be retained. When the channel member 5 and associated wiper unit are in the act of being turned to the position illustrated in Figures 7, 8 and 12 through 14, the cam portion 12 of the channel will ride out of the seat 8 on the wiper arm until a surface adjacent the crest of the cam engages the abutment 9 and that portion of the arm adjacent its longitudinal marginal edge formerly engaged by the boss 14 will ride into the concave seat 18 between the bosses 14 and 15, and as a result of the tension or stress and other contributing factors, the channel member will be tilted with respect to the arm to assume the desired operative position substantially at right angles to the surface to be cleaned as exemplified in Figure 4 of the drawing so that the wiping element 20 forming a part of the wiper unit may vacillate or pivot the same extent in each direction as the wiper unit is directed across the windshield. Such tilting serves to compensate for the irregularities alluded to above and exemplified in Figure 3 of the drawing.

Figure 5:
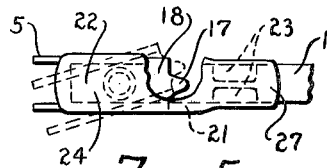
Figure 5 is a top view partially in section illustrating a wiper arm, including a shroud associated therewith.
Figure 6:
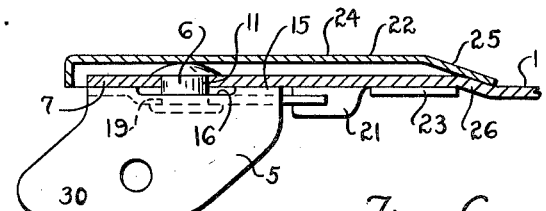
Figure 6 is an enlarged longitudinal section taken through Figure 5 illustrating details of the assembly.
Figure 9:
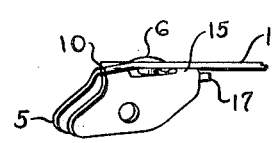
Figure 9 is a side view similar to Figure 8 showing one of the parts moved to a different position.
Figure 10:
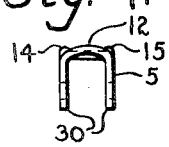
Figure 10 is an end view of one of the connecting parts secured to the operating arm.

The channel member 5 and associated wiper unit may be swung to any one of a plurality of angular positions desired within a predetermined range or arc of movement. In other words, the channel and wiper unit may be moved to the position indicated in Figures 7 and 8 to compensate for the angular position exemplified in Figure 2, when the apparatus is applied to one pane of the windshield; and to the position illustrated in Figures 5 and 9 to compensate for the angular displacement when corresponding apparatus is applied to the other pane of the windshield.

Attention is directed to the fact that the compensating means, which comprises the cooperating means provided on the wiper arm and the channel member, is so constructed and arranged that the tilting of the channel member with respect to the arm is accomplished gradually. More specifically, the compensating means has been scientifically developed and engineered so that the channel and associated wiper unit will tilt to a minimum extent when the wiper unit is moved slightly out of alignment with the wiper arm to compensate for such disalignment, which of course takes into consideration the distance the point of connection between the inner extremity of the wiper arm and the drive shaft is located in advance of the windshield as described above. Obviously, when the wiper unit is moved further out of alignment with the wiper arm, the compensating means will act or function to tilt the channel member and wiper unit a greater extent to compensate for such increased angle of disalignment.

Any suitable means for the purpose may be provided for controlling or predetermining the range of movement of the channel member within practicable limits. In the present embodiment of the invention, the range is defined by a pair of stops 21, one or the other of which may be engaged by the finger 17 on the channel. The stops 21 are preferably provided on an ornamental shroud or housing 22 which may be secured to the arm by a pair of locking portions 23 which are inturned to engage the under surface of the arm. The outer wall 24 of the shroud may engage the pivot rivet 6 and the inner extremity of the shroud may be angled as at 25 to engage a shoulder or abutment 26 on the arm whereby to assist in holding the shroud against movement in an axial direction.

Any means may be employed for connecting the wiper unit to the arm. As herein illustrated the connection means employed includes, among other things, the channel 5, a clip 27, and a mounting 28, the latter of which serves to mount the clip for pivotal movement with respect to the holder or backing 29 of the wiper unit. The side walls 30 of the channel member 5 are preferably bridged by a cross pin 31 which cooperates with suitable latch or holding mechanism on the clip when the latter is received between the walls 30 of the channel.

I have described what I believe to be the best embodiments of my invention. I do not wish, however, to be confined to the embodiments shown, but what I desire to cover by Letters Patent is set forth in the appended claims.

I claim:

1. A windshield wiper arm provided with a substantially planar portion, means for supporting a wiper blade unit permanently mounted on said arm for pivotal movement, said supporting means being provided with a substantially planar portion underlying said first-mentioned planar portion and also provided with a concave portion, the arrangement being such that when the supporting means is pivoted so that its planar portion is not coextensive with the planar portion on the arm, an edge of the latter planar portion will rest in the concave portion to cause the supporting means to assume a tilted position with respect to the arm.

2. A windshield wiper arm, said arm being provided with a substantially planar portion, an elongated member for supporting a wiper blade unit, said member having a base wall portion disposed substantially parallel to said planar portion, rivet means extending through said portions permanently and pivotally connecting the member to the arm, and a pair of spaced raised abutment means provided on said base wall portion and a pair of spaced abutment means provided on said substantially planar portion, the arrangement being such that when the elongated member is aligned with the planar portion of the arm the pair of abutment means on the base wall of the member will engage the pair of abutments on said planar portion to maintain the said portions in parallel relation and when the member is pivoted to predetermined extent only one of the abutment means on the base wall portion of the member will engage only one of the abutment means on the planar portion of the arm and thereby place said portions out of parallel relationship.

3. A member for supporting a windshield wiper unit to an operating arm provided with a pair of abutments, said member being pivotally connected to the arm and provided with a plurality of portions, one of said plurality of portions being engageable with said abutments, other portions being adapted to engage the arm at points remote from said abutments when said member is in a position substantially in alignment with said arm, and said member, when pivoted out of alignment with respect to said arm, being adapted to assume a tilted position in which one of said abutments will engage said one portion of said member and one of said other portions of said member will engage said arm.

4. A windshield wiper arm, abutment means provided adjacent the outer extremity of the arm, a member pivotally mounted adjacent said outer extremity for supporting a wiper blade unit, and a pair of projections and a cam provided on said member engaging said arm in one position, said abutment means, said projections, and said cam being constructed and arranged whereby when the member is moved to another position so that the abutment means on the arm engages one of said projections and is out of contact with the other projection said member will be tilted with respect to said arm.

5. A windshield wiper arm provided with a substantially planar portion, means pivotally mounted on said arm for supporting a wiper blade unit, said supporting means having a wall engaging said planar portion, said wall being provided with an indented portion, the arrangement being such that when the supporting means is pivoted so that its wall is not coextensive with the planar portion on the arm, an edge of the planar portion will rest in the indented portion to cause the supporting means to assume a tilted position with respect to the arm.

6. A member for supporting a windshield wiper blade unit to an operating arm provided with a dished seat, said member being pivotally connected to the arm and provided with a cam engaging the seat and a pair of bosses spaced from the cam engaging the arm when said member is in a position substantially in alignment with said arm, and said member, when pivoted out of alignment with respect to said arm, being adapted to assume a tilted position in which only a portion of the cam engages said seat and only one of said bosses will engage said arm.

7. A windshield wiper arm having a portion of predetermined width, a fitting pivotally connected to said arm portion for supporting a wiper blade, and said fitting having a pair of abutments, the arrangement being such that when the fitting is located in one position both abutments will engage the arm portion and when manually located in another position only one of the abutments will engage the arm portion to cause the fitting to tilt with respect to the arm and remain in that condition.

8. A windshield wiper arm provided with a substantially planar portion, means pivotally mounted on said arm for supporting a wiper blade unit, said supporting means having a wall engaging said planar portion, said wall being provided with an indented portion, the arrangement being such that when the supporting means is pivoted so that its wall is not coextensive with the planar portion on the arm, an edge of the planar portion will rest in the indented portion to cause the supporting means to assume a tilted position with respect to the arm, a shroud carried by the arm overlying its planar portion, a projection provided on the supporting means, and means provided on the shroud forming stops for the projection whereby to limit the range of pivotal movement of the supporting means.

FRED A. KROHM.

References Cited in the file of this patent

UNITED STATES PATENTS

| Number | Name | Date |
| --- | --- | --- |
| 1,389,129 | Dell | Aug. 30, 1921 |
| 1,695,326 | Folberth | Dec. 18, 1928 |
| 2,264,167 | Paulus | Nov. 25, 1941 |
| 2,286,004 | O'Shei | June 9, 1942 |